United States Patent [19]

Ruske et al.

[11] Patent Number: 4,935,499
[45] Date of Patent: Jun. 19, 1990

[54] CATIONIC AZO DYES WITH A 1-HYDROXYNAPHTHALENE 3-SULFONIC ACID COUPLING COMPONENT, USEFUL FOR COLORING PAPER

[75] Inventors: Manfred Ruske, Ludwigshafen; Hans-Juergen Degen, Lorsch, both of Fed. Rep. of Germany

[73] Assignee: BASF Aktiengesellschaft, Ludwigshafen, Fed. Rep. of Germany

[21] Appl. No.: 250,994

[22] Filed: Sep. 27, 1988

Related U.S. Application Data

[63] Continuation of Ser. No. 895,935, Aug. 13, 1986, abandoned.

[30] Foreign Application Priority Data

Aug. 22, 1985 [DE] Fed. Rep. of Germany ....... 3529968

[51] Int. Cl.$^5$ .................. C09B 44/02; C09B 29/033; D06P 1/41; D21H 3/80
[52] U.S. Cl. .................................. 534/605; 534/798; 534/804; 162/162; 8/536; 8/684; 8/919
[58] Field of Search ....................... 534/605, 798, 804; 162/162; 8/536, 684, 919

[56] References Cited

FOREIGN PATENT DOCUMENTS 1135589 3/1963 Fed. Rep. of Germany ...... 534/605
1266898 4/1968 Fed. Rep. of Germany ...... 534/605
0472486 6/1969 Switzerland ..................... 534/605

OTHER PUBLICATIONS

Rev Prog Coloration, vol. 14, 1984, Cationic Dyestuffs, pp. 187–203, Raue.

Primary Examiner—Floyd D. Higel
Attorney, Agent, or Firm—Oblon, Spivak, McClelland, Maier & Neustadt

[57] ABSTRACT

Paper is colored by a process in which a compound which, in the form of the free acid, is of the formula I

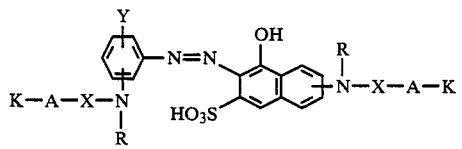

where, in each case independently of one another,
  A is unsubstituted or methyl substituted $C_1$–$C_6$-alkylene or vinylene,
  R is each hydrogen or $C_1$–$C_4$-alkyl,
  X is each —CO— or —SO$_2$—,
  K is each a cationic group and
  Y is hydrogen, chlorine or bromine.

11 Claims, No Drawings

CATIONIC AZO DYES WITH A 1-HYDROXYNAPHTHALENE 3-SULFONIC ACID COUPLING COMPONENT, USEFUL FOR COLORING PAPER

This application is a continuation of application Ser. No. 895,935, filed on Aug. 13, 1986, now abandoned.

SUMMARY OF THE INVENTION

The present invention relates to a process for coloring paper, wherein a compound which, in the form of the free acid, is of the general formula I

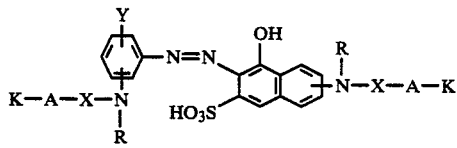

where, in each case independently of one another, the radicals

A are each unsubstituted or substituted $C_1$-$C_6$-alkylene or vinylene, the radicals R are each hydrogen or $C_1$-$C_4$-alkyl, the radicals X are each —CO— or —$SO_2$—, and the radicals K are each a cationic group and Y is hydrogen, chlorine or bromine, is used.

DETAILED DESCRIPTION OF THE PREFERRED EMBODIMENTS

Specific examples of radicals A are

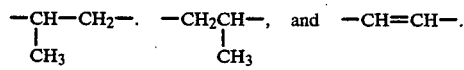

R may be $CH_3$, $C_2H_5$, $C_3H_7$ or $C_4H_9$, but is preferably hydrogen.

X is preferably —CO—.

Particularly suitable basic or cationic radicals are amino, hydrazine and hydroxylamino groups, which may furthermore be quaternized. These are, in particular, the groups

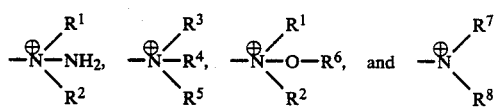

in which $R^1$ to $R^4$ independently of one another are each unsubstituted or OH-substituted $C_1$-$C_4$-alkyl, $R^5$ and $R^6$ independently of one another are each $C_1$-$C_4$-alkyl, $R^7$ is hydrogen, $C_1$-$C_4$-alkyl which is unsubstituted or substituted by hydroxyl, phenyl or carbamyl, or phenyl or cyclohexyl which is unsubstituted or substituted by 1, 2 or 3 methyl groups, $R^8$ is hydrogen or $C_1$-$C_4$-alkyl which is unsubstituted or substituted by hydroxyl, phenyl or carbamyl, $R^1$ and $R^2$ or $R^3$ and $R^4$ or $R^7$ and $R^8$ together with the common N atom may form a pyrrolidine, piperidine, morpholine or piperazine ring, and $R^3$, $R^4$ and $R^5$ together with the common N atom may form an unsubstituted or alkyl-substituted imidazoline or pyridinium ring or a radical of the formula

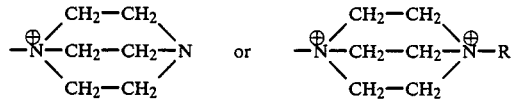

Where K is a cationic hydrazine radical of the formula

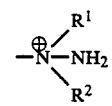

$R^1$ and $R^2$ independently of one another are each alkyl of 1 to 4 carbon atoms. The alkyl radicals may be unsubstituted or substituted by hydroxyl or, together with the common nitrogen atom, may form a pyrrolidine, piperidine, morpholine or piperazine ring. Examples of suitable radicals are:

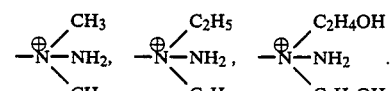

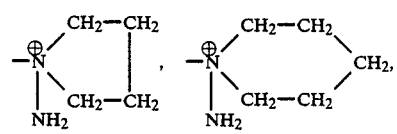

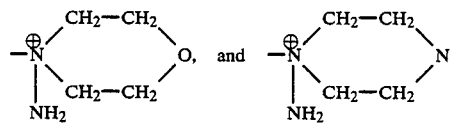

Where K is a group of the formula

$R^3$, $R^4$ and $R^5$ independently of one another are each alkyl of 1 to 4 carbon atoms, and $R^3$ and $R^4$ may furthermore be substituted by phenyl or hydroxyl. $R^3$ and $R^4$, likewise with the common N atom, may form a pyrrolidine, piperidine, morpholine or piperazine ring.

Examples of suitable cationic groups of this type are:

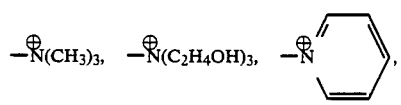

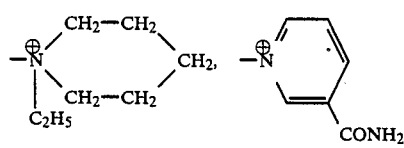

-continued

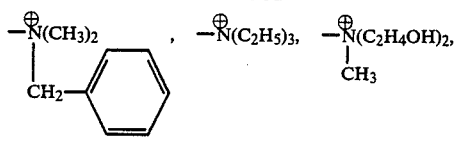

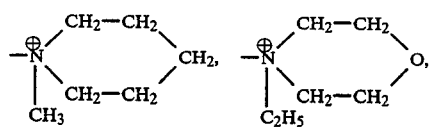

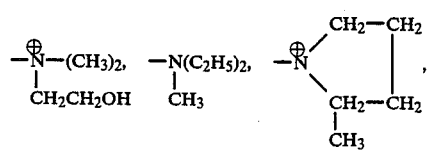

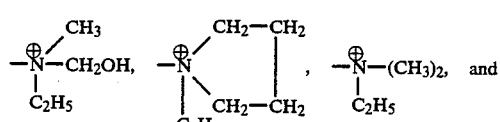

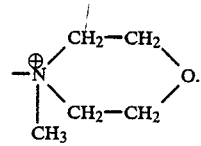

Where K is a cationic hydroxylamino radical of the formula

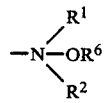

$R^1$ and $R^2$ have the meanings stated above. $R^6$ is alkyl of 1 to 4 carbon atoms. Examples of cationic hydroxylamino radicals are:

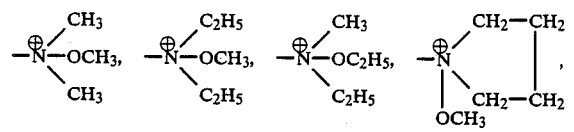

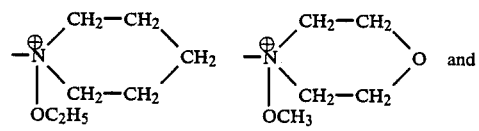

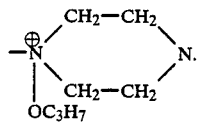

Finally, K may furthermore be an amino group of the formula

In this group, $R^7$ and $R^8$ are each hydrogen or alkyl of 1 to 4 carbon atoms, and alkyl may furthermore be substituted by hydroxyl, phenyl or carbamyl. $R^7$ may furthermore be cyclohexyl which is unsubstituted or substituted by 1, 2 or 3 methyl groups, or may be phenyl. Finally, $R^7$ and $R^8$, together with the common N atom, may form a pyrrolidine, piperidine, morpholine or piperazine ring. Examples of amino groups of this type are:

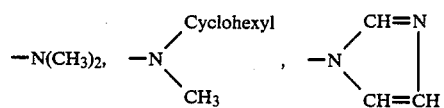

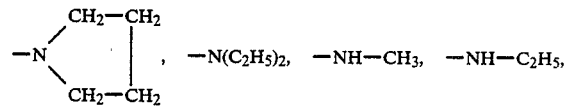

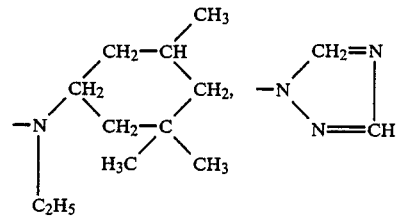

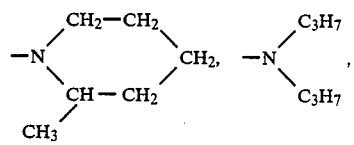

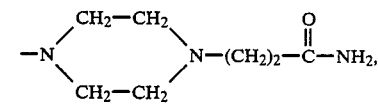

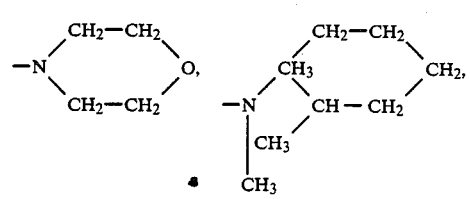

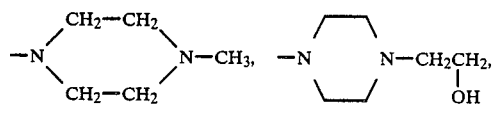

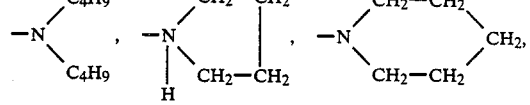

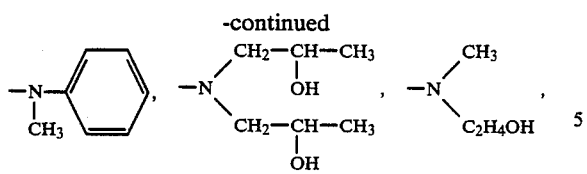, 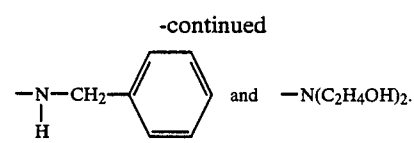
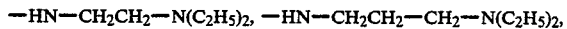 and $-N(C_2H_4OH)_2$.
In addition to these basic or cationic radicals, K may furthermore be a radical of a basic or cationic polyamine.
Examples of polyamine radicals from the large number of possible ones are:
$-HN-CH_2CH_2-N(C_2H_5)_2$, $-HN-CH_2CH_2-CH_2-N(C_2H_5)_2$,
$-HN-CH_2CH_2CH_2OCH_2CH_2OCH_2CH_2CH_2NH_2$,
$-HN-CH_2CH_2CH_2OCH_2CH_2CH_2CH_2-O-(CH_2)_3-NH_2$,
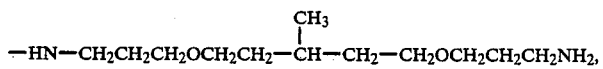
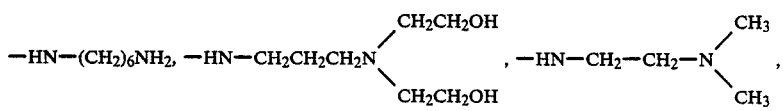
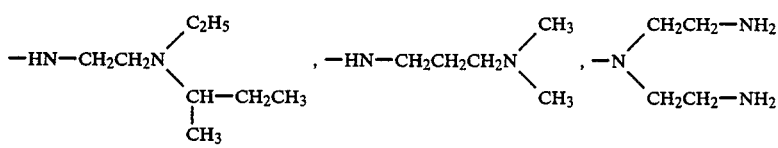
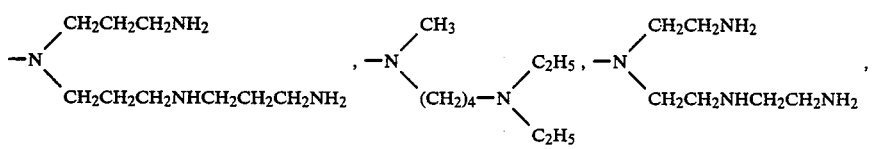
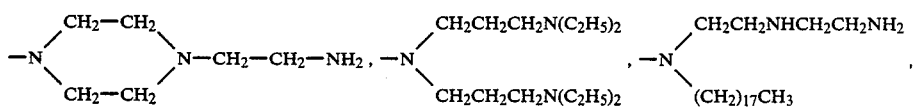
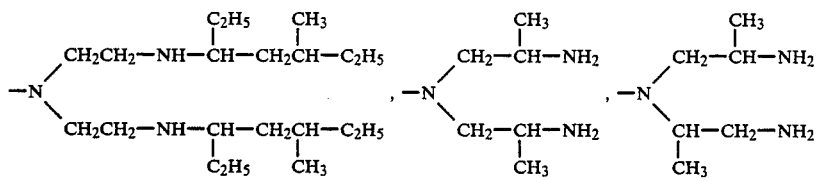
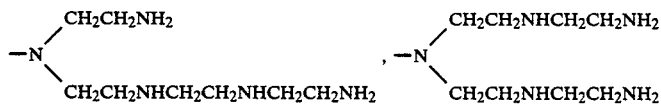
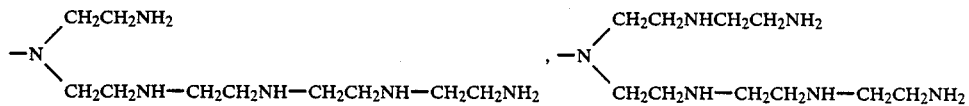
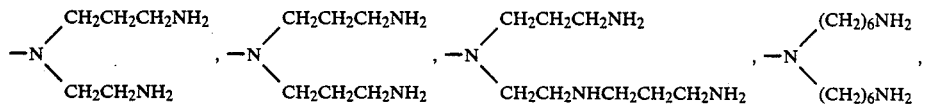

-continued

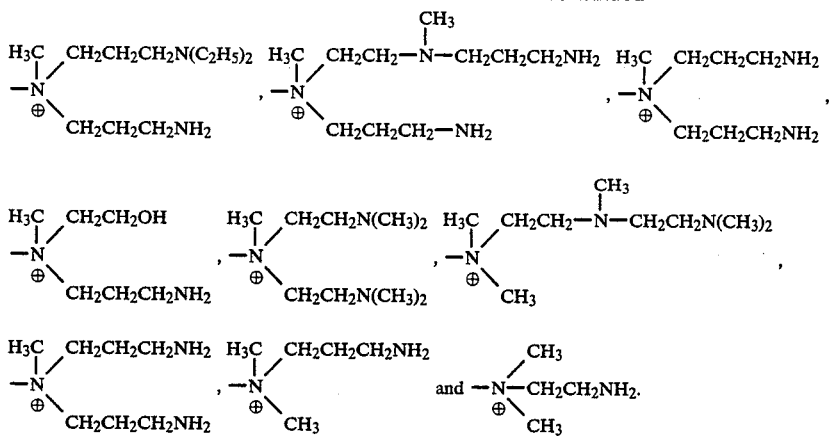

Where K is a cationic group, the azo compounds of the formula I are in the form of their inorganic or organic salts.

Suitable counter-ions are both inorganic and organic anions, eg. methylsulfate, aminosulfate, benzenesulfonate, naphthalenesulfonate, oxalate, maleate, formate, acetate, hydroxyacetate, methoxyacetate, propionate, lactate, succinate, tartrate, methanesulfonate and benzoate.

Examples of preferred anions are formate, acetate, hydroxyacetate, methoxyacetate, lactate, aminosulfate and methanesulfonate.

In the azo compounds of the formula I, the sulfonic acid groups may furthermore form an internal salt with one of the cationic groups K.

The dyes of the formula I are synthesized by the methods described in German Patent 1,135,589 or 1,266,898 or by methods similar to these.

The examples which follow illustrate the preparation.

Parts and percentages are by weight, unless stated otherwise.

The azo compounds of the formula I are used either as powder preparations or granules or in the form of concentrated solutions. Powder preparations are standardized in a conventional manner with standardizing materials, such as sodium sulfate, phosphate or acetate, in the presence of dust inhibitors, or the azo compounds are introduced commercially directly in the form of spray-dried preparations. Concentrated dye solutions may be of an aqueous or aqueous/organic type, conventional, very readily degradable additives being preferred, such as organic acids, preferably acetic acid, methoxyacetic acid, methanesulfonic acid, formic acid, lactic acid or citric acid, amides, such as formamide, dimethylformamide or urea, alcohols, such as glycol, diglycol and diglycol ethers, preferably the methyl or ethyl ether.

According to the invention, the azo compounds of the formula I are particularly suitable as dyes for coloring and printing paper by a conventional method. The azo compounds are preferably used for coloring and printing paper, semicardboard and cardboard in the pulp and for surface coloring.

They are suitable for all types of papers, especially bleached, unsized and sized lignin-free paper; bleached or unbleached pulp can be used as a starting material, and hard wood or soft wood pulp, such as birch and/or pine sulfite and/or sulfate pulp may be employed. These compounds are very particularly useful for coloring unsized paper (eg. napkins, tablecloths, hygienic papers), because of their great affinity to this substrate.

The novel azo compounds of the formula I are readily absorbed by these substrates, the effluent being virtually colorless.

The colorations obtained possess good allround fastness, such as comparatively good lightfastness coupled with great clarity and depth and good wetfastness, ie. they have no tendency to bleed when colored paper in the wet state is brought into contact with moist white paper. Moreover, they have good fastness to alumn, acids and alkalis. The hue of the colorations is not altered by fillers such as kaolin and talc.

The high affinity for paper and the high absorption rate of the novel dyes is very advantageous for the continuous coloring of paper.

The colored papers can very readily be bleached, both with chlorine bleaches and with hydrosulfite bleaches.

Of particular importance are compounds of the formula I a

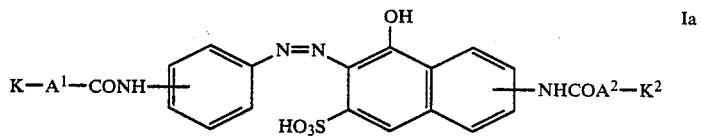

where
$A^1$ and $A^2$ independently of one another are each $CH_2$ or $C_2H_4$ and
$K^1$ and $K^2$ have the meanings stated for K.
Examples of preferred radicals K are:

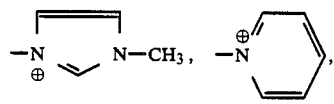

-continued

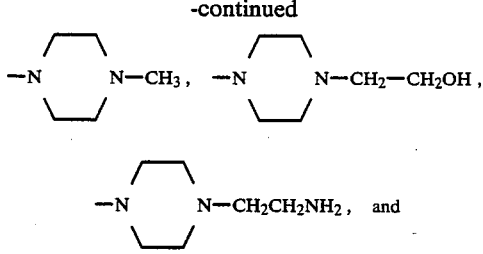

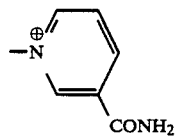

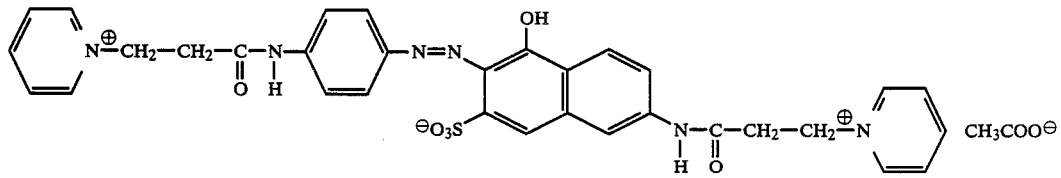

The present invention furthermore relates to novel compounds of the formula I in which one or both of the radicals K is a nicotinamide radical.

EXAMPLE 1

70 parts of chemically bleached sulfite pulp (from soft wood) and 30 parts of chemically bleached sulfite pulp (from birch wood) in 2000 parts of water are beaten in a beater.

0.2 part of the dye of the formula is sprinkled into this pulp.

This pulp is mixed for 20 minutes and then converted to paper. The absorptive paper obtained in this manner has a yellowish-red color. The effluent is virtually colorless. The paper can very readily be bleached and has good lightfastness and fastness to bleeding.

Similar results are obtained if the dye is replaced by a dye from the table below.

| Formula Ia | | A¹ | A² | K¹ | K² | Hue |
|---|---|---|---|---|---|---|
| Structure: naphthol with OH, ⊖O₃S, azo group; positions (4), (6), (7) | | | | | | |
| 2 | 4 | —CH₂—CH₂— | —CH₂—CH₂— | imidazolium N—CH₃ | imidazolium N—CH₃ | red |
| 3 | 4 | —CH₂—CH₂— | —CH₂—CH₂— | N-methylpyridinium | imidazolium N—CH₃ | red |
| 4 | 4 | —CH₂—CH₂— | —CH₂—CH₂— | imidazolium N—CH₃ | N-methylpiperazinium | red |
| 5 | 4 | —CH₂—CH₂— | —CH₂—CH₂— | pyridinium | N-(2-aminoethyl)-N-methylpiperazinium | red |
| 6 | 4 | —CH₂—CH₂— | —CH₂— | imidazolium N—CH₃ | pyridinium | red |

Additional azo-phenyl substituent pattern: substituted at positions (4) and (3).

-continued

| Formula Ia | ![structure with OH, ⊖O₃S, naphthalene showing positions (6) and (7)] | | A¹ | A² | K¹ | K² | Hue |
|---|---|---|---|---|---|---|---|
| 7 | 4 | 6 | —CH₂— | —CH₂—CH₂— | [imidazolium with N—CH₃] | 3-methylpyridinium | red |
| 8 | 3 | 6 | —CH₂—CH₂— | —CH₂—CH₂— | [imidazolium with N—CH₃] | pyridinium | orange |
| 9 | 4 | 7 | —CH₂—CH₂— | —CH₂—CH₂— | [imidazolium with N—CH₃] | [imidazolium with N—CH₃] | bluish-red |
| 10 | 4 | 7 | —CH₂—CH₂— | —CH₂—CH₂— | pyridinium | [imidazolium with N—CH₃] | bluish-red |

EXAMPLE 11

25 kg of catalog paper (waste), 60 kg of bleached groundwood (65° Schopper Riegler) and 15 kg of unbleached sulfite pulp in 2500 l of water are beaten in a pulper. 0.4% of soluble starch, 16% of kaolin and 2% of talc (based on dry fiber) are added to the 4% strength aqueous stock suspension, and the latter is then beaten to 45° Schopper Riegler in a refiner. 12 kg of a 10% strength solution of the dye of the formula

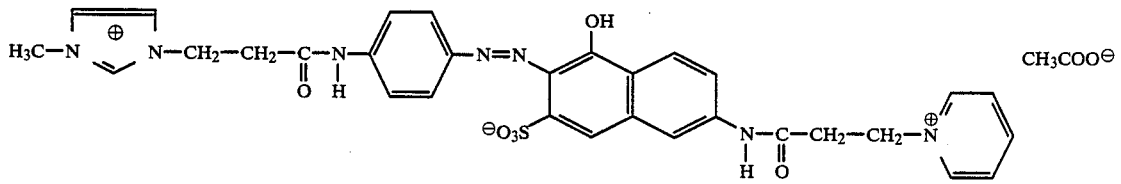

are added to the stock suspension, the said solution containing acetic acid. This corresponds to 1%, based on absolutely dry fiber, of dry red dye. After an absorption time of 15 minutes, a resin size dispersion is added to the stock, in an amount corresponding to 0.6%, based on fiber, of dry resin size. After 10 minutes, the stock flowing out of the mixing chest is diluted continuously with water to a consistency of 0.8% and brought continuously with alum [$Al_2(SO_4)_3 \cdot 18H_2O$] to pH 4.5 (measured in the backwater), and pumped into the headbox. Yellowish-red catalog paper (60 g/m$^2$) having good lightfastness and fastness to water is obtained. The manufacturing wastes can readily be bleached with chlorine bleaches.

Using the dyes in the table below instead of the above dye gives red to orange paper which has good fastness properties and can readily be bleached with chlorine bleaches.

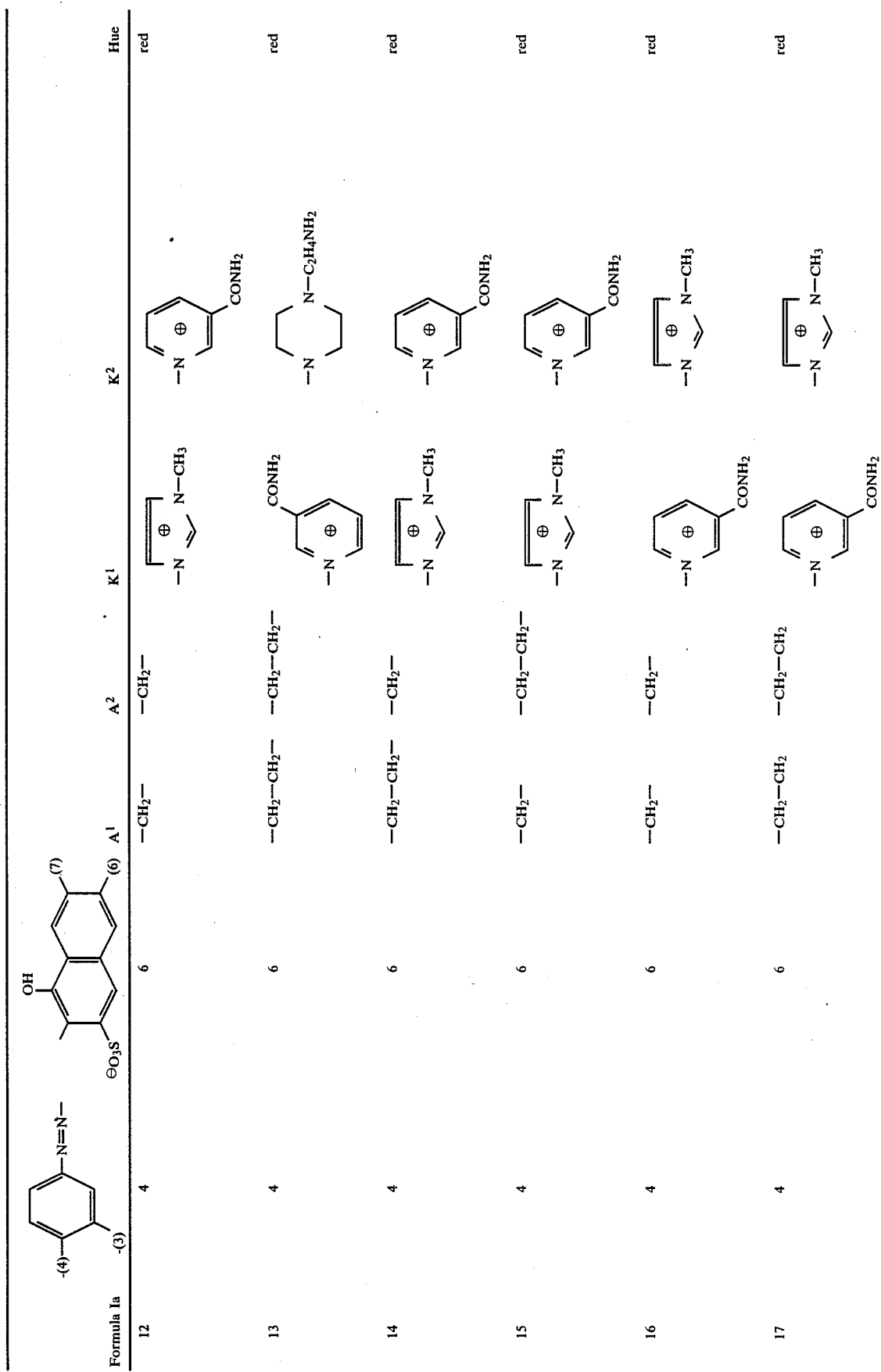

-continued

Formula Ia:

A naphthalene structure with OH, CH₃, ⊖O₃S substituents and N=N- azo linkage to a phenyl group with positions (3), (4), (6), (7) indicated. A¹ at position (6), (7).

| Formula Ia | -(3) | -(4) | (6) A¹ | (7) | A¹ | A² | K¹ | K² | Hue |
|---|---|---|---|---|---|---|---|---|---|
| 18 | 4 | | 6 | | —CH₂— | —CH₂—CH₂— | pyridinium-3-CONH₂ (N-linked) | imidazolium N—CH₃ | red |
| 19 | 4 | | 6 | | —CH₂—CH₂— | —CH₂—CH₂— | pyridinium-3-CONH₂ (N-linked) | pyridinium-3-CONH₂ (N-linked) | red |
| 20 | 4 | | 6 | | —CH₂—CH₂— | —CH₂—CH₂— | pyridinium-3-CONH₂ (N-linked) | piperazinium N—CH₃ | red |
| 21 | 4 | | 6 | | —CH₂—CH₂— | —CH₂— | pyridinium (N-linked) | pyridinium-3-CONH₂ (N-linked) | red |
| 22 | 4 | | 6 | | —CH₂—CH₂— | —CH₂—CH₂— | imidazolium N—CH₂—CH₂—CONH₂ | pyridinium-3-CONH₂ (N-linked) | red |

-continued

| Formula Ia | -(3) | (6) A¹ | A² | K¹ | K² | Hue |
|---|---|---|---|---|---|---|
| 23 | 4 | 6 —CH₂—CH₂— | —CH₂—CH₂— | ![structure with N-oxygen ring N-CH₂-CH₂-CONH₂] | ![structure N-CH=CH-N-CH₂CH₂CONH₂] | |
| 24 | 4 | 6 —CH₂—CH₂ | —CH₂CH₂— | ![H₃C-N piperazine N-] | | |
| 25 | 4 | 6 —CH₂—CH₂— | —CH₂CH₂— | ![H₃C-N⊕=CH-N-] | ![pyrazinone with Cl, =O, NH-CH₂-CH₂-CH₂-N(CH₃)₂] | |
| 26 | 4 | 6 —CH₂—CH₂— | —CH₂CH₂— | ![N-phenylpiperazine] | | |

Diazo component (shown at left of table):
HO₃S-⊕ — naphthalene with OH, CH₃, positions (6),(7), linked via —N=N— to phenyl with positions (3),(4)

EXAMPLE 27

15 kg of mechanical waste paper, 25 kg of bleached groundwood and 10 kg of unbleached sulfate pulp are beaten to a 3% strength aqueous stock suspension in a pulper. The stock suspension is diluted to 2% strength in a dyeing vat. 0.5% of soluble, oxidatively degraded corn starch, 5% of kaolin and 1.25 kg of a 5% strength solution of the dye of the formula

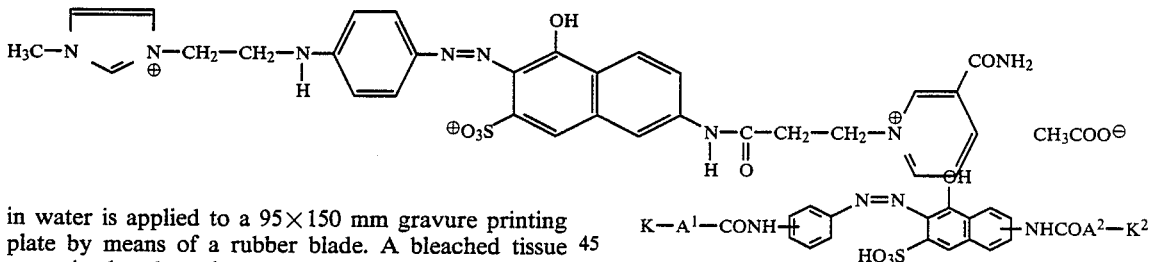

which solution contains acetic acid, are then added in succession to this suspension, while stirring, the percentages being based on total dry fibers. After 20 minutes, 1%, based on absolutely dry fiber, of a resin size dispersion is added to the stock in the mixing chest. The homogeneous stock suspension is brought to pH 5 with alum on the paper machine, just upstream of the headbox.

An 80 g/m² machine finished bag paper which has a red hue, good fastness to bleeding according to DIN 53,991 and good lightfastness is produced on the paper machine.

EXAMPLE 28

A 10% strength solution of the dye

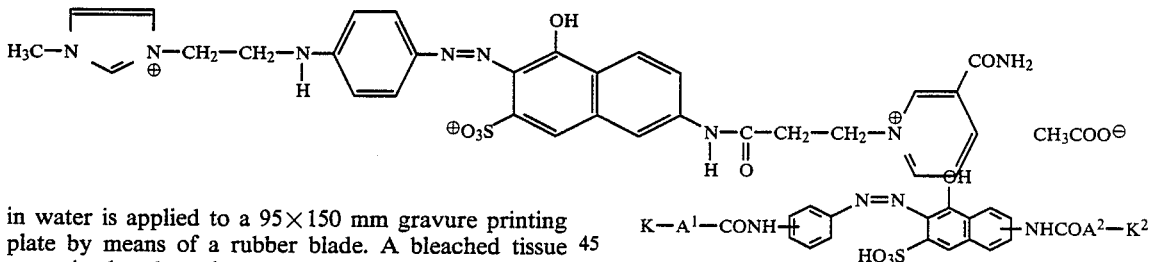

in water is applied to a 95×150 mm gravure printing plate by means of a rubber blade. A bleached tissue paper is placed on the gravure printing plate, covered with a non-absorptive paper and rolled with a steel roller weighing 20 kg. The tissue paper provided with a red print is dried.

The print has good lightfastness and fastness to water.

We claim:

1. A compound for coloring paper of the formula (I)

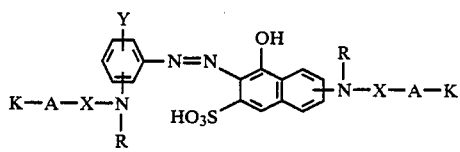

wherein:
each A is independently $C_1$-$C_6$-alkylene or $C_1$-$C_6$-vinylene or a methyl substituted $C_1$-$C_6$-alkylene or $C_1$-$C_6$-vinylene;
each R is independently hydrogen or $C_1$-$C_4$-alkyl;
each group X is independently —CO— or —$SO_2$—;
each group K is independently:

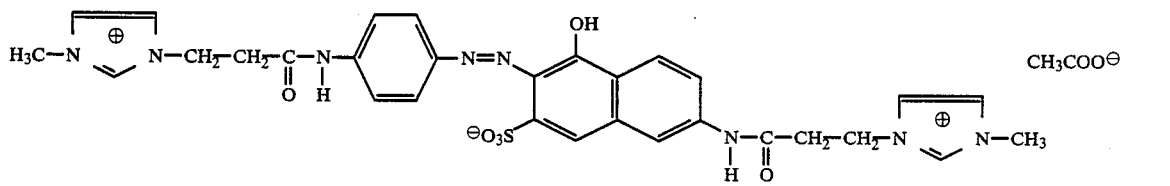
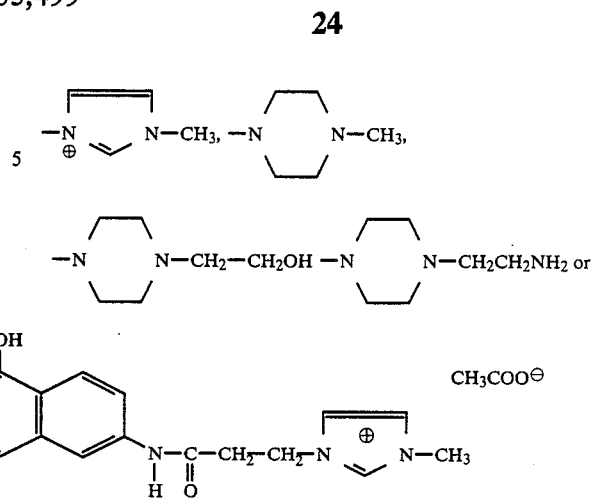

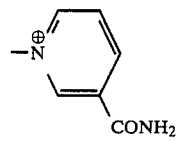

or a salt thereof.

2. The compound of claim 1, wherein said compound is of the formula (Ia)

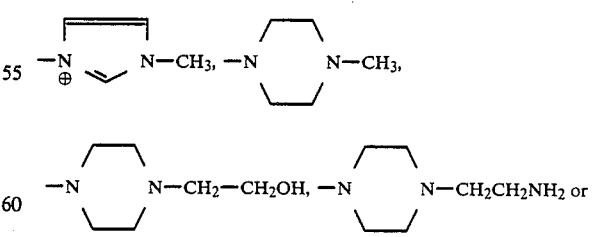

wherein:
each group $A^1$ and $A^2$ is independently $CH_2$ or $C_2H_4$; and
each group $K^1$ and $K^2$ is independently

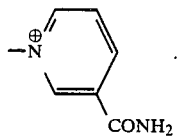

3. The compound of claim 1, wherein each A is independently —CH(CH₃)—CH₂— or —CH₂—CH(CH₃)— or —CH=CH—;
   each R is independently CH₃, C₂H₅, C₃H₇ or C₄H₉, or hydrogen; and
   X is —CO—.

4. The compound of claim 3, wherein each R is hydrogen.

5. The compound of claim 1, wherein K is cationic and is associated with a counter-ion selected from the group consisting of methylsulfate, aminosulfate, benzenesulfonate, naphthalenesulfonate, oxalate, maleate, formate, acetate, hydroxyacetate, methoxyacetate, propionate, lactate, succinate, tartrate, methanesulfonate and benzoate.

6. The compound of claim 5, wherein said counter-ion is an anion selected from the group consisting of formate, acetate, hydroxyacetate, methoxyacetate, lactate, aminosulfate and methanesulfonate.

7. The compound of claim 1, wherein at least one K is

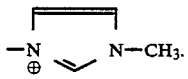

8. The compound of claim 1, wherein at least one K is

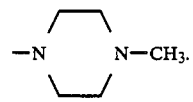

9. The compound of claim 1, wherein at least one K is

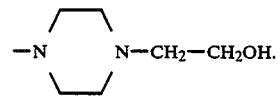

10. The compound of claim 1, wherein at least one K is

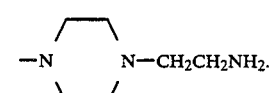

11. The compound of claim 1, wherein at least one K is

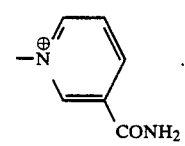

* * * * *